US005762849A

United States Patent [19]
Argast et al.

[11] Patent Number: 5,762,849
[45] Date of Patent: Jun. 9, 1998

[54] MOLDING MATERIAL

[75] Inventors: Detlef Argast, Bochum; Heinz Peirick, Coesfeld; Ralf Schueler, Recklinghausen, all of Germany

[73] Assignee: Huels Aktiengesellschaft, Marl, Germany

[21] Appl. No.: 840,766

[22] Filed: Apr. 16, 1997

[30] Foreign Application Priority Data

Apr. 16, 1996 [DE] Germany ................. 196 14 871.5

[51] Int. Cl.$^6$ ........................................ B25B 3/20
[52] U.S. Cl. ................ 264/176.1; 524/101; 528/176; 528/196
[58] Field of Search ................. 524/101; 528/176, 528/196; 264/176.1

[56] References Cited

U.S. PATENT DOCUMENTS 3,218,372  11/1965  Okamura et al. .................. 528/272

FOREIGN PATENT DOCUMENTS

| 55998 | 7/1966 | Australia. |
| 827 693 | 10/1975 | Belgium. |
| 26 22 414 | 12/1976 | Germany. |
| 31 50 957 | 11/1982 | Germany. |
| WO 80/00972 | 5/1980 | WIPO. |

*Primary Examiner*—Terressa Mosley
*Attorney, Agent, or Firm*—Oblon, Spivak, McClelland, Maier & Neustadt, P.C.

[57] ABSTRACT

Plastic blends are provided that contain polyester and polycarbonate in combination with isocyanates or isocyanurates or their derivatives and bis(oxazoline) derivatives as additives, to give a molding material having improved hydrolytic resistance and improved chemical and mechanical properties.

19 Claims, No Drawings

MOLDING MATERIAL

BACKGROUND OF THE INVENTION

1. Field of the Invention

The present invention relates to a molding material based on polyesters and polycarbonates, preferably linear thermoplastic polyesters and polycarbonates.

2. Description of the Related Art

Polyesters are known and proven structural materials which can be processed by methods such as injection molding or extrusion. However, shaped articles produced in this manner frequently have undesirably high shrinkage so that, in many cases, polyesters are unsuitable as structural materials. In order to avoid these known disadvantages of polyesters, blends of polyester and polycarbonate have been used (see, for example, AU 55998/65, WO-A-80/972, German Offenlegungsschrift 2,622,414, BE 827 693 and U.S. Pat. No. 3,218,372). In comparison with molding materials comprising polyesters, however, these polyester/polycarbonate blends have less resistance to steam, heat and chemicals.

It is known that polyester molding materials may contain bisoxazolines (German Offenlegungsschrift 3,150,957). Chain extension can be achieved by adding the bisoxazoline, with the result that thermal degradation of the polyester molding material during processing can be compensated. Moreover, while a certain level of improvement in hydrolytic resistance is achieved, it is still insufficient for many intended uses, such as for optical waveguides or wire insulations.

SUMMARY OF THE INVENTION

Accordingly, one object of the present invention is to provide a molding material comprising a polyester/polycarbonate blend that is transparent and provides minimal shrinkage upon molding into shaped articles.

A further object of the present invention is to provide a molding material comprising a polyester/polycarbonate blend that provides good chemical resistance and improved hydrolytic resistance compared to conventional polyester/polycarbonate blends.

These and other objects of the present invention have been satisfied by the discovery of a molding material comprising the following components:

A) from 41 to 99% by weight, preferably 50 to 90% by weight, more preferably 60 to 80% by weight, of a linear thermoplastic polyester and B) from 1 to 59% by weight, preferably 10 to 50% by weight, more preferably 20 to 40% by weight, of a polycarbonate, C) from 0.02 to 5% by weight—based on the sum of the components (A+B)—of (C1) an isocyanate, a diisocyanate, a polyisocyanate or a derivative thereof or (C2) an isocyanurate, a diisocyanurate, a polyisocyanurate or a derivative thereof, and D) from 0.02 to 2% by weight—based on the sum of the components (A+B)—of a compound of the formula (I)

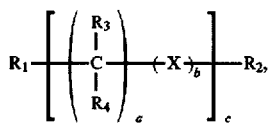

in which $R_1$ and $R_2$ each are

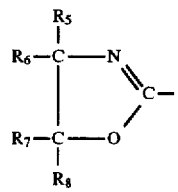

$R_3$ to $R_8$ are each, independently, H, or $C_{1-12}$ aliphatic or cycloaliphatic radicals, x is a $C_{6-12}$ aromatic radical or a $C_{3-12}$ cycloaliphatic radical, a is from 0 to 12, b is 0 or 1 and c is 0 or 1, and the sum of the components C)+D) is at least 0.04% by weight, preferably at least 0.2% by weight and more preferably at least 1.0% by weight.

DETAILED DESCRIPTION OF THE PREFERRED EMBODIMENTS

The stated percentages by weight are based in all cases on the sum of the components A and B. Within the context of the present invention, the molding material of the present invention is the composition that results upon combining the components recited and includes any product that results from the interaction of such components.

The linear polyesters (component A) of the present invention have the following basic structure

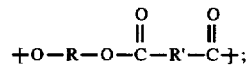

wherein:

R represents a divalent, branched or straight-chain aliphatic and/or cycloaliphatic radical having 2 to 12, preferably 2 to 8, carbon atoms in the carbon chain and R represents a divalent aromatic radical having 6 to 20, preferably 8 to 12, carbon atoms in the carbon skeleton.

The linear polyesters (component A) can be formed by any conventional method for preparation of polyesters, such as polycondensation between a diol and an aromatic dicarboxylic acid.

Suitable diols for use in preparing the linear polyester include ethylene glycol, trimethylene glycol, tetramethylene glycol, hexamethylene glycol, neopentyl glycol, and cyclohexanedimethanol.

Up to 25 mol %, preferably up to 12 mol %, more preferably up to 6 mol %, of the stated diols may be replaced by a second diol selected from those already mentioned above or by a diol having the following general formula

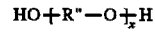

wherein R" is a divalent radical having 2 to 4 carbon atoms and x is a value from 2 to 50, preferably 4 to 50, more preferably 8 to 50.

Preferred diols include ethylene glycol and tetramethylene glycol, with tetramethylene glycol being more preferred.

Suitable aromatic dicarboxylic acids include terephthalic acid, isophthalic acid, 1,4-, 1,5-, 2,6- and 2,7-naphthalenedicarboxylic acids, diphenic acid and 4,4'-dicarboxydiphenyl ether, with terephthalic acid being preferred.

Up to 20 mol %, preferably up to 10 mol %, more preferably up to 5 mol %, of these dicarboxylic acids can be replaced by aliphatic dicarboxylic acids, such as succinic acid, maleic acid, fumaric acid, sebacic acid or dodecanedioic acid.

The preparation of the linear, crystalline polyesters of the present invention can be performed by conventional methods, such as those described in German Laid-Open Applications 2,407,155 and 2,407,156; *Ullmanns Encyclopädie der technischen Chemie*, 4th Edition, Vol. 19, page 65 et seq. —Verlag Chemie GmbH, Weinheim, 1980; and Sorensen and Campbell—*Preparative Methods of Polymer Chemistry*, Interscience Publ., New York (1961), page 111 et seq., the relevant portions of which are hereby incorporated by reference.

The polyesters used according to the invention preferably have a viscosity number (J value) in the range from 80 to 240 cm³/g, more preferably 110 to 210 cm³/g, most preferably 140 to 180 cm3/g.

The polyesters of component A may contain up to 40% by weight, preferably up to 20% by weight, more preferably up to 10% by weight, of other thermoplastics, provided that they do not interfere with the properties according to the invention. Suitable other thermoplastics include acrylonitrile/styrene/butadiene copolymers (Houben-Weyl, *Methoden der organischen Chemie*, Vol 14/1, Georg Thieme Verlag Stuttgart, pages 393–406; *Ullmanns Encyclopädie der technischen Chemie*, 4th Edition, Vol. 19, Verlag Chemie Weinheim (1981), pages 279–284), acrylonitrile/styrene/acrylate copolymers (*Ullmanns Encyclopädie der technischen Chemie*, 4th Edition, Vol. 19, Verlag Chemie Weinheim (1981), pages 277–295), acrylonitrile/styrene copolymers (*Ullmanns Encyclopädie der technischen Chemie*, 4th Edition, Vol. 19, Verlag Chemie Weinheim (1981), page 273 et seq.) or polyphenylene ethers (German offenlegungsschrift 3,224,691 or 3,224,692; U.S. Pat. Nos. 3,306,874, 3,306,875 and 4,028,341).

If desired, the polyesters may be toughened using conventional modifiers. Suitable modifiers include ethylene/propylene or ethylene/propylene/diene copolymers (EP-A-295 076), polypentenylene, polyoctenylene or random or block copolymers of alkenylaromatic compounds with aliphatic olefins or dienes (EP-A-261 748). Rubber impact modifiers may also be used, such as core/shell rubbers having a tough and resilient core of (meth)acrylate, butadiene or styrene/butadiene rubber with glass transition temperatures $T_g < -10°$ C., with the core possibly being crosslinked. The shell may be composed of styrene and/or methyl methacrylate and/or other unsaturated monomers (German Offenlegungsschrift 2,144,528 or 3,728,685).

The polycarbonates of component B may be either homopolycarbonates or copolycarbonates. Preferably used polycarbonates are those which are based on diphenols, di(hydroxyphenyl)alkanes and/or di(hydroxyphenyl) ethers. Specific suitable examples of starting components include 2,2-bis(4-hydroxyphenyl)propane, bis(4-hydroxyphenyl) methane, 4,4'-dihydroxydiphenyl ether, 4,4'-dihydroxydiphenyl sulfide, 4,4'-dihydroxydiphenyl sulfone, 4,4'-dihydroxy-3,3',5,5'-tetramethyldiphenyl sulfone, 4,4'-dihydroxybenzophenone, 4,4'-dihydroxybiphenyl, hydroquinone, 1,4-dihydroxynaphthalene, 1,5-dihydroxynaphthalene and 2,6-dihydroxynaphthalene. Polycarbonates based on 2,2-bis(4-hydroxyphenyl)propane (bisphenol A) are preferably used.

These polycarbonates and their preparation are known [see H. Schnell, *Chemistry and Physics of Polycarbonates*, Interscience Publ., New York (1981) the contents of which are hereby incorporated by reference].

The polycarbonates used according to the present invention preferably have a solution viscosity (viscosity number J) of from 20 to 100 cm³/g, more preferably 40 to 80 cm³/g, most preferably 50 to 70 cm³/g.

The molding material of the present invention contains from 41 to 99% by weight, preferably from 60 to 80% by weight, of linear polyester and from 1 to 59% by weight, preferably from 20 to 40% by weight, of polycarbonate.

Compounds which carry one or more isocyanate groups, i.e. isocyanates, diisocyanates, polyisocyanates and derivatives thereof, may be used as component C. Suitable isocyanate compounds include aromatic and (cyclo)aliphatic isocyanates, such as 1,4-phenylene diisocyanate, 2,4-toluylene diisocyanate, 2,6-toluylene diisocyanate, 1,5-naphthylene diisocyanate, 1,6-hexamethylene diisocyanate, diphenylmethane 2,4-diisocyanate, diphenylmethane 4,4'-diisocyanate, diphenylmethane 2,2'-diisocyanate, isophorone diisocyanate, 1,4-tetramethylene diisocyanate and 1,12-dodecanediisocyanate. Further examples include cyclohexane 1,3-diisocyanate, cyclohexane 1,4-diisocyanate, cyclobutane 1,3-diisocyanate, 2,4-hexahydrotoluylene diisocyanate, 2,6-hexahydrotoluylene diisocyanate, hexahydro-1,3-phenylene diisocyanate, hexahydro-1,4-phenylene diisocyanate, norbornane diisocyanate, p- or m-xylylene diisocyanates, perhydro-2,4-diphenylmethane diisocyanate and perhydro-4,4'-diphenylmethane diisocyanate.

Further suitable isocyanate compounds include isophorone diisocyanate and reaction products thereof with itself and with suitable reactants, such $\alpha,\omega$-diols having 2 to 10 C atoms in the carbon chain. These products have proven particularly advantageous as component C of the present invention.

Preferred reaction products are obtained, for example, from the reaction of at least two molecules of isophorone diisocyanate, the bond being produced in each case by reaction of two isocyanate groups with the formation of a biuret group.

Further advantageous reaction products can be obtained, for example, by reacting two isophorone diisocyanate molecules with a molecule of a diol, wherein one of the isocyanate groups of the isophorone diisocyanate forms a urethane bond with one of the hydroxyl groups of the diol. Examples of particularly suitable diols include butanediol and diethylene glycol.

Compounds which contain more than two isocyanate groups may also be used as component C. Suitable compounds of this type include triphenylmethane 4,4',4"-triisocyanate, as well as reaction products of the diisocyanates mentioned above, including isocyanurates, diisocyanurates, polyisocyanurates and derivatives thereof. In particular triisocyanurates of these diisocyanates are particularly preferred, such as the triisocyanurate which is formed from the reaction of three molecules of hexamethylene diisocyanate. The triisocyanurate formed by reacting in each case three molecules of isophorone diisocyanate is most preferred.

The isocyanate groups of component C may also be present in blocked form. The blocking of isocyanate groups is known (for example, see *Paint Resin* 58 (1988) 5, 18–19). The isocyanate groups can be blocked by reaction of the isocyanate groups with reactive compounds, such as diols, pyrazoles, oximes (in particular ketoximes) and lactams (in particular caprolactam).

The isocyanates may be used individually or as a mixture. They are present in the molding material in an amount of from 0.02 to 5% by weight, preferably from 0.5 to 2% by weight—based in each case on the sum of the components (A+B).

The component D is a compound of the formula (I)

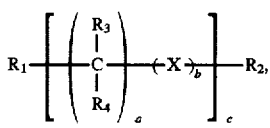

in which $R_1$ and $R_2$ are each

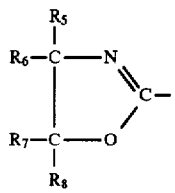

$R_3$ to $R_8$ are each, independently, H or a $C_{1-12}$ (preferably $C_{1-6}$) aliphatic or cycloaliphatic radical, x is a $C_{6-12}$ (preferably $C_{6-10}$) aromatic radical or a $C_{3-12}$ (preferably $C_{5-8}$) cycloaliphatic radical;

a is a value from 0 to 12 (preferably 1 to 8); and b and c are each, independently, 0 or 1.

Suitable examples of the bis-oxazoline component D include methylenebis(2-oxazoline), ethylenebis (2-oxazoline), ethylenebis (4-methyl-2-oxazoline), propylenebis(2-oxazoline), tetramethylenebis(2-oxazoline), hexamethylenebis(2-oxazoline), octamethylenebis(2-oxazoline), p-phenylenebis(2-oxazoline), p-phenylenebis(4-methyl-2-oxazoline), p-phenylenebis(4,4-dimethyl-2-oxazoline), p-phenylenebis(4-phenyl-2-oxazoline), m-phenylenebis(2-oxazoline), m-phenylenebis(2-methyl-2-oxazoline), m-phenylenebis(4,4-dimethyl-2-oxazoline), m-phenylenebis(4-phenyl-2-oxazoline), o-phenylenebis(2-oxazoline), phenylenebis(4-methyl-2-oxazoline), bis(2-oxazoline), bis(4-methyl-2-oxazoline), bis(4-ethyl-2-oxazoline) and bis(4-phenyl-2-oxazoline).

m-Phenylenebis(2-oxazoline) and p-phenylenebis(2-oxazoline) are preferred.

The bisoxazolines may be used individually or as a mixture. They are contained in the molding material in an amount of from 0.02 to 2% by weight, preferably from 0.5 to 1% by weight—based in each case on the sum of the components (A+B).

The preparation of molding materials according to the present invention is preferably carried out in the melt, more preferably in a continuous kneading unit, such as a twin-screw extruder, in which the polyester component and the polycarbonate component are thoroughly mixed in the melt with the addition of the desired amount of components C and D at high shear rates and at temperatures between 200° and 350° C.

The lower limit of the working temperature is determined by the melting point of the higher-melting component, and the upper temperature limit is determined by any decomposition and degradation reactions which may occur. As a rule, it is preferred to keep the temperature of the melt close to the upper temperature limit. In order to remove volatile products which may occur, it is also preferred to devolatilize the melt by applying a reduced pressure.

The components A to D can, in principle, be added in any desired order. A procedure in which the components A and B are introduced simultaneously with the components C and D into the first feed of the kneader and melted together is preferred. Another embodiment involves metering components A and B simultaneously into the first feed of the kneader and metering components C and D into the second feed downstream.

One or more conventional assistants and additives, such as flameproofing agents, stabilizers, processing assistants, viscosity improvers, fillers, and pigments may be added to the molding material.

The molding materials according to the present invention are distinguished by substantially improved hydrolytic resistance in comparison with molding materials which do not contain the additives of components C and D. Furthermore, the molding materials of the present invention are transparent and have chemical resistance which is just as good as that of molding materials based on polyesters. In addition to the good general properties, shaped articles produced from the molding materials exhibit very little shrinkage.

EXAMPLES

Having generally described this invention, a further understanding can be obtained by reference to certain specific examples which are provided herein for purposes of illustration only and are not intended to be limiting unless otherwise specified.

The results stated in the Examples were determined with the aid of the following measuring methods.

The determination of the solution viscosity (viscosity number J) of the polyesters, of the polycarbonates and of the molding materials was carried out in a 0.5% strength by weight phenol/o-dichlorobenzene solution (weight ratio 1:1) at 25° C. according to DIN 53 728/ISO 1628—Part 3.

For the determination of the hydrolytic resistance, the samples (injection moldings, for example tensile test bars) were stored in a humid environment under the Bellcore conditions at 94% relative humidity and 85° C. After the appropriate aging times (for example 7, 14, 21, ... days), the solution viscosity of the test specimens was determined according to DIN 53728-T3. A rapid decrease in the solution viscosity indicated low stability to hydrolysis.

The Experiments denoted by letters are comparative examples and are not according to the present invention.

The molding materials stated below were prepared in a twin-screw kneader from Werner & Pfleiderer, type ZSK 30. The processing temperature was about 260° C.; with a throughput of about 15 kg/h. All components were dry blended together beforehand, then the dry blend was metered into the first feed.

Experiment A

Composition of the molding material:

A. 75 parts by weight of homopolybutylene terephthalate (J value: 165; VESTODUR® 3000—Hüls AG);

B. 25 parts by weight of polycarbonate (based on bisphenol A; J value: 80; MAKROLON®3200—Bayer AG);

0.2% by weight—based on the sum (A+B)—of the stabilizer IRGANOX® 1010 (Ciba Geigy);

This molding material gave an opaque melt and resulted in opaque shaped articles.

Experiment B

Composition of the molding material:

A. 75 parts by weight of homopolybutylene terephthalate (J value: 165; VESTODUR® 3000—Hüls AG);

B. 25 parts by weight of polycarbonate (based on bisphenol A; J value: 80; MAKROLON® 3200—Bayer AG);

0.2% by weight—based on the sum (A+B)—of the stabilizer IRGANOX® 1010;

1% by weight—based on the sum (A+B)—of m-phenylenebis(2-oxazoline);

This molding material also gave an opaque melt and opaque shaped articles.

Experiment 1

(In accordance with the present invention)
Composition of the molding material:

A. 75 parts by weight of homopolybutylene terephthalate (J value: 165; VESTODUR® 3000—Hüls AG);

B. 25 parts by weight of polycarbonate (based on bisphenol A; J value 80; MAKROLON® 3200—Bayer AG);

0.2% by weight—based on the sum (A+B)—of the stabilizer IRGANOX®1010;

1% by weight—based on the sum (A+B)—of m-phenylenebis(2-oxazoline);

1% by weight of a uretdione/butanediol adduct based on isophorone diisocyanate. (VESTAGON® BF 1540—Hüls AG);

The resulting molding material according to the present invention gave a transparent melt. When molded into shaped articles, the shaped articles were also transparent.

TABLE 1

| | Resistance to hydrolysis | | |
|---|---|---|---|
| Time [Days] | Experiment A J value [cm³/g] | Experiment B J value [cm³/g] | Experiment 1 J value [cm³/g] |
| 0 | 120 | 140 | 140 |
| 7 | 101 | 132 | 141 |
| 14 | 95 | 122 | 134 |
| 21 | 89 | 116 | 130 |
| 28 | 81 | 106 | 122 |
| 35 | 76 | 99 | 116 |
| 42 | 66 | 93 | 110 |
| 56 | 59 | 80 | 100 |
| 63 | — | 74 | 95 |
| 70 | — | 69 | 89 |
| 77 | — | 65 | 86 |

As can be seen from the above table, the composition in accordance with the present invention gave surprising resistance to hydrolysis even over a period of 77 days, commpared to the comparative compositions which contained only A+B and a stabilizer (Experiment A) or A+B+D and a stabilizer (Experiment B). The combination of components A-D as required in the present invention provides unexpected improvements in the resulting molded articles, particularly in transparency and hydrolytic resistance.

This application is based on German Patent application 196 14 871.5 filed in the German Patent Office on Apr. 16, 1996, the contents of which are entirely hereby incorporated by reference. Obviously, additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A molding material comprising:
A) from 41 to 99% by weight of a linear thermoplastic polyester;
B) from 1 to 59% by weight of a polycarbonate;
C) from 0.02 to 5% by weight, based on the sum of the components (A+B), of (C1) at least one member selected from the group consisting of isocyanates, diisocyanates, polyisocyanates and derivatives thereof; or (C2) at least one member selected from the group consisting of isocyanurates, diisocyanurates, polyisocyanurates and derivatives thereof;
and
D. from 0.02 to 2% by weight, based on the sum of the components (A+B), of a compound of formula (I):

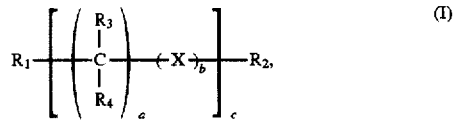

wherein $R_1$ and $R_2$ are each, independently,

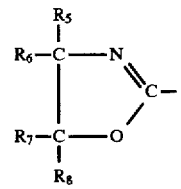

$R_3$ to $R_8$ are each, independently, H or a $C_{1-12}$ aliphatic or cycloaliphatic radical, X is a $C_{6-12}$ aromatic radical or a $C_{3-12}$ cycloaliphatic radical, a is from 0 to 12,
b is 0 or 1 and
c is 0 or 1.

2. The molding material as claimed in claim 1, wherein component C) is a member selected from the group consisting of isocyanurates, diisocyanurates, polyisocyanurates and derivatives thereof.

3. The molding material as claimed in claim 1, wherein component C) is a member selected from the group consisting of isocyanates, diisocyanates, polyisocyanates and derivatives thereof.

4. The molding material as claimed in claim 1, wherein component C) is present in an amount of from 0.5 to 2% by weight, based on the sum of the components (A+B).

5. The molding material as claimed in claim 3, wherein said component C is a diisocyanate.

6. The molding material as claimed in claim 1, wherein said component C is isophorone diisocyanate or a compound derived therefrom by reaction with itself or with diols.

7. The molding material as claimed in claim 1, wherein said component C is an isocyanurate derived from isophorone diisocyanate.

8. The molding material as claimed in claim 1, wherein said component C comprises lactam-blocked isocyanate groups.

9. The molding material as claimed in claim 1, wherein component D is present in an amount of from 0.5 to 1% by weight, based on the sum of the components (A+B).

10. The molding material as claimed in claim 1, wherein component D is m-phenylenebis(2-oxazoline) or p-phenylenebis(2-oxazoline).

11. The molding material as claimed in claim 1, wherein said component A is a polyester having a viscosity number, J value, in a range from 80 to 240 cm³/g.

12. The molding material as claimed in claim 11, wherein said polyester has a viscosity number, J value, of from 110 to 210 cm³/g.

13. The molding material as claimed in claim 1, wherein said component B is a polycarbonate having a solution viscosity of from 20 to 100 cm$^3$/g.

14. The molding material as claimed in claim 13, wherein the polycarbonate has a solution viscosity of from 40 to 80 cm$^3$/g.

15. The molding material as claimed in claim 1, wherein component A is present in an amount of from 60 to 80% by weight and component B is present in an amount of from 20 to 40% by weight.

16. The molding material as claimed in claim 1, wherein said component A is polyethylene terephthalate.

17. The molding material as claimed in claim 1, wherein said component A is polybutylene terephthalate.

18. The molding material as claimed in claim 1, wherein said component B is a polycarbonate prepared from 2,2-bis(4-hydroxyphenyl)propane.

19. The molding material as claimed in claim 1, wherein said component C is a reaction product of isophorone diisocyanate with an $\alpha,\omega$-diol having from 2 to 10 carbons in the carbon chain.

* * * * *